No. 792,673.

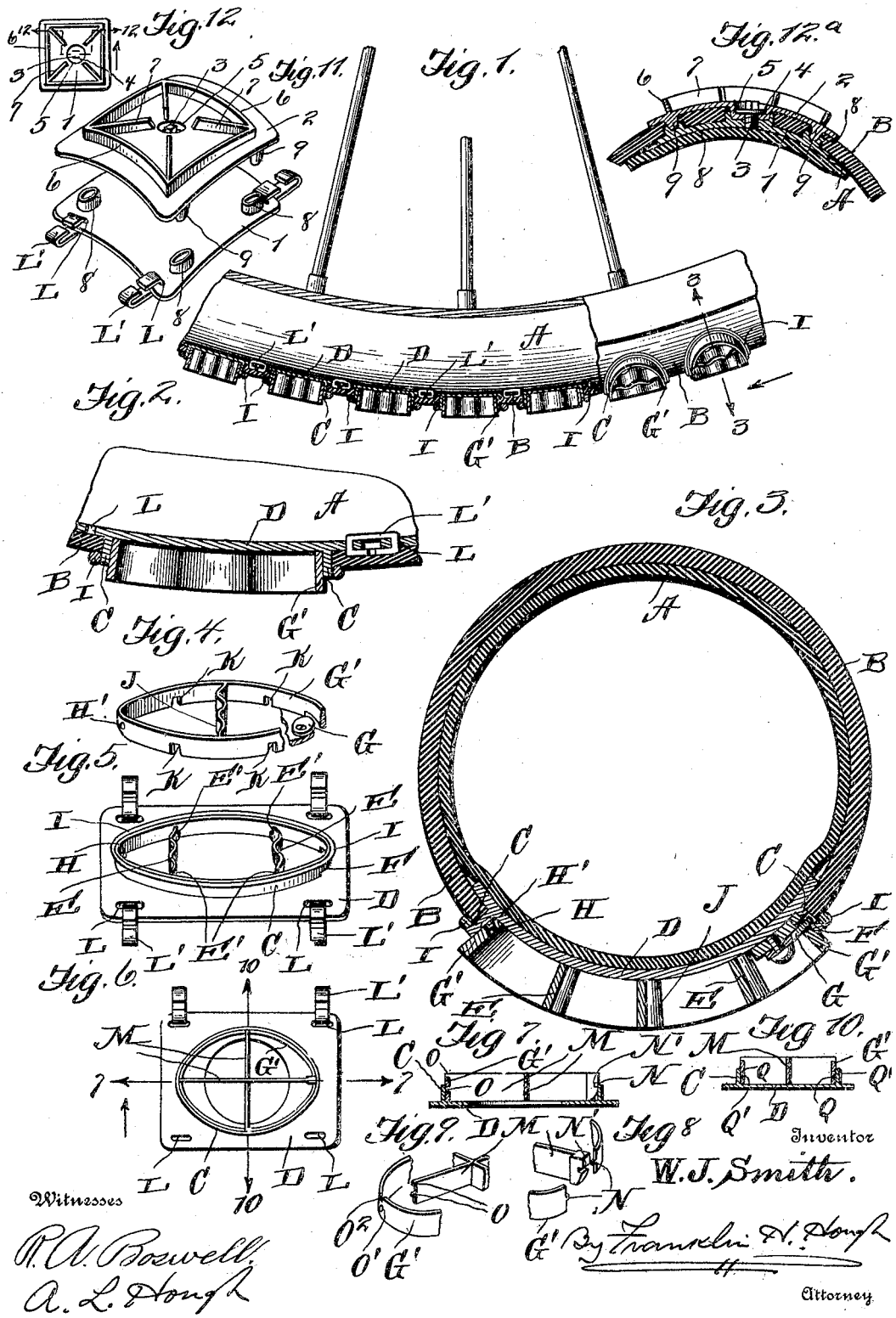

Patented June 20, 1905.

UNITED STATES PATENT OFFICE.

WILLIAM J. SMITH, OF CANASTOTA, NEW YORK, ASSIGNOR OF ONE-HALF TO LESLIE G. FISCHER, OF CANASTOTA, NEW YORK.

GRIP-TREAD FOR PNEUMATIC TIRES.

SPECIFICATION forming part of Letters Patent No. 792,673, dated June 20, 1905.

Application filed February 24, 1905. Serial No. 247,152.

*To all whom it may concern:*

Be it known that I, WILLIAM J. SMITH, a citizen of the United States, residing at Canastota, in the county of Madison and State of New York, have invented certain new and useful Improvements in Grip-Treads for Pneumatic Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to antislipping devices adapted for use in connection with pneumatic tires; and the object of the invention is to provide a chain of elliptical cup-shaped members which are embedded in the outer rubber casing of the tire in such a manner that if the vehicle is making a sharp turn the elliptical cup-shaped members will have a tendency to grip themselves in the ice, or if it is a bicycle-wheel in the act of making a sharp turn the pointed end of the elliptical cup-shaped members will dig themselves in the ice.

Another object of the invention is to make the elliptical cup-shaped members in two parts, one of which is embedded in the outer casing of the tire and also is adapted to receive the other half of said member, and is, furthermore, to provide the two parts of the antislipping device with catch and locking devices, whereby the two parts will be held securely together.

A further object is to provide the elliptical members with base-plates, said plates being provided with slot-and-link devices, whereby the plates may be joined in sequence, so that the chain of elliptical cup-shaped members will extend the entire circumference of the wheel.

A still further object of the invention is to provide the cup-shaped members with crossbars, said bars being convoluted in edge view, which affords more efficient means to keep the wheel from slipping.

The cup-shaped members may be made circular instead of elliptical, and also the invention may be made in a chain-like form and locked to the tire in any suitable manner; but the preferred form is to embed each cup-shaped member in the outer casing of the tire. The base-plate of the cup-shaped member may be made smaller and hexagonal in shape and linked together in rows, forming a network of cup-shaped members, which may be locked upon the pneumatic tire in any suitable manner.

To these ends and to such others as the invention may pertain the same consists in the novel construction and in the peculiar arrangement, combination, and adaptation of parts, all as will be more fully hereinafter described, shown in the accompanying drawings, and then pointed out in the appended claims.

The invention is illustrated in the accompanying drawings, which, with the characters of reference marked thereon, form a part of this application, and in which drawings such characters indicate like parts in the views, in which—

Figure 1 is a side elevation of a part of a wheel, showing the invention applied thereto. Fig. 2 is an enlarged sectional view of one of the cup-shaped members. Fig. 3 is an enlarged sectional view on line 3 3 of Fig. 1, taken at right angles to that shown in Fig. 2. Fig. 4 is a detail perspective view of the removable part of the device, partly broken away. Fig. 5 is a detail perspective view of the embedded part of the device. Fig. 6 is a plan view of a modified form. Fig. 7 is a sectional view on line 7 7 of Fig. 6. Fig. 8 is a fragmental view showing the locking device at one end of the modified form. Fig. 9 is a fragmental view showing the locking device at the other end of the modified form. Fig. 10 is a sectional view on line 10 10 of Fig. 6. Fig. 11 is a detail view of a modified form wherein the device is made square, showing the two plates disassembled. Fig. 12 is a plan view of the form shown in Fig. 11, and Fig. 12$^a$ is a sectional view on line 12 12 of Fig. 12.

Reference now being had to the details of the drawings by letters and numerals, A indicates the inner tube of an ordinary pneumatic tire, and B the outer casing. Embedded in the outer casing is an elliptical flange C of a rectangular base-plate D. Reaching across at each end of the elliptical-shaped flange are convoluted vertically-disposed bars E, having cut-away portions E' at each end thereof. At one end of the elliptical-shaped flange is a slot F, adapted to receive the locking-disk G of the corresponding elliptical-shaped ring G', and at the other end of the elliptical-shaped flange is a stud H, adapted to be inserted into an aperture H' in the corresponding end of the elliptical-shaped ring G'. Thus it will be understood how the two parts of the elliptical-shaped cup are securely locked together by referring to the accompanying drawings. To prevent the elliptical-shaped flange from being pushed toward the center of the tire, a bead I is provided at the top of said flange. Reaching across the middle of the elliptical-shaped ring G' is a convoluted vertically-disposed bar J, similar to the bar E. To allow the said ring to be inserted in the elliptical-shaped flange C, notches K are provided on the lower edge of said ring to register with the cut-away portions E' of the bar E. To allow the said cup-shaped members to be linked together in chain-like form, slots L are provided at meeting edges of the base-plates D, said slots being provided for the purpose of receiving the connecting-links L'. Thus it will be understood how said members are connected together by referring to the different figures of the drawings.

In Figs. 6, 7, 8, 9, and 10 intersecting bars M are shown to lock the elliptical-shaped ring in place. In these figures the elliptical-shaped ring is severed at one end, and each meeting end of the severed portion is provided with lugs N, said lugs being adapted to be received by the notch N' at one end of the longest intersecting bar M, whereby when the same is pushed down the curved portion of the said end will have a tendency to expand the elliptical-shaped ring. At the opposite end of the longest bar M lugs O are provided for the purpose of engagement with an aperture O' and a notch O² to prevent the intersecting bars from being lifted out of place. At right angles to the longest bar M apertures Q are provided upon said elliptical-shaped ring, which are to be engaged by lugs Q' upon the inner circumference of said flange C, thereby preventing the elliptical-shaped ring from being removed.

Figs. 11, 12, and 12ª show another modification wherein two plates 1 and 2 are shown. Said plates are square and clamp the outer rubber casing of the tire between them by means of a screw-bolt 3, having a circumferential flange 4, which is adapted to seat itself in a depression 5, formed in the upper plate 2. The upper plate 2 is provided with a rectangular flange 6 and radial ribs 7, joining at the corners of said flange. Projecting up from the bottom plate and through the outer casing at each corner are sockets 8, which receive the downwardly-projecting lugs 9. Thus it will be seen how the modified form of device is clamped about the circumference of the wheel and also how the upper plate is prevented from having lateral or pivotal movement.

From the foregoing description of the invention the operation and detailed construction will be readily understood, and of course it will be distinctly understood that various changes may be made in the details of construction and combination of parts other than that illustrated in the accompanying drawings without in any way departing from the spirit and scope of the invention.

Having thus fully described my invention, what I claim as new, and desire to secure by Letters Patent, is—

1. In a device of the character described, the combination of the inner and outer casings of a pneumatic tire, a base-plate inserted between said casings, a flange integral with said base-plate, bars reaching from one side of said flange to the other, said bars having cut-away portions at the ends thereof, an elliptical-shaped ring adapted to be inserted between said flanges, and notches upon the lower circumference of said elliptical-shaped ring to register with the cut-away portions of said bars, as set forth.

2. In a device of the character described, the combination of the inner and outer casings of a pneumatic tire, a base-plate inserted between said casings, a flange integral with said base-plate, a bead around said flange to prevent the latter from being pushed toward the center of the tire, bars reaching from one side of said flange to the other, said bars having cut-away portions at the ends thereof, an elliptical-shaped ring adapted to be inserted between said flanges, a bar reaching across the center of said ring, notches in said ring to engage the cut-away portions in the bars of said flange, and means to lock the two elliptical-shaped members together, as set forth.

3. In a device of the character described, the combination with the inner and outer casings, of a series of base-plates adapted to be inserted between said inner and outer casings, elliptical-shaped flanges integral with said base-plates, means to prevent said plates and flanges from being pushed toward the center of the tire, a slot in each flange, a correspondingly-shaped ring adapted to be inserted between said flanges, means at one end of said members to hold them securely together, and means at the other end of said correspondingly-shaped ring to engage said slots in said flanges, as set forth.

4. In a device of the character described, the combination with the inner and outer casings, a series of base-plates linked together by slot-and-link devices, said plates being adapted to be inserted between said inner and outer casings, elliptical-shaped flanges integral with each base-plate, means to prevent said plates and flanges from being pushed toward the center of the tire, bars reaching from one side of said flanges to the other and having cut-away portions at the ends thereof, slots in the ends of said flanges, elliptical-shaped rings adapted to be inserted between said flanges, means at one end of said flanges to securely hold said rings in place, and means to engage said slots to lock said elliptical-shaped members in place, as set forth.

In testimony whereof I hereunto affix my signature in presence of two witnesses.

WILLIAM J. SMITH.

Witnesses:
CHARLES W. WORDEN,
F. B. HEUSTS.